United States Patent
Fukuzono et al.

(12)

(10) Patent No.: US 12,250,034 B2
(45) Date of Patent: Mar. 11, 2025

(54) DISTRIBUTED ANTENNA SYSTEM, WIRELESS COMMUNICATION METHOD, AND CENTRALIZED STATION

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Masafumi Yoshioka, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 3 days.

(21) Appl. No.: 18/271,253

(22) PCT Filed: Jan. 7, 2021

(86) PCT No.: PCT/JP2021/000384
§ 371 (c)(1),
(2) Date: Jul. 7, 2023

(87) PCT Pub. No.: WO2022/149244
PCT Pub. Date: Jul. 14, 2022

(65) Prior Publication Data
US 2024/0063850 A1 Feb. 22, 2024

(51) Int. Cl.
*H04B 7/0452* (2017.01)
*H04B 7/024* (2017.01)

(52) U.S. Cl.
CPC ........... *H04B 7/0452* (2013.01); *H04B 7/024* (2013.01)

(58) Field of Classification Search
CPC ...... H04B 7/0452; H04B 7/024; H04B 7/022; Y02D 30/70
See application file for complete search history.

(56) References Cited

U.S. PATENT DOCUMENTS

| | | | | |
|---|---|---|---|---|
| 6,222,761 B1 * | 4/2001 | Gerber | ................... | G11C 16/10 365/185.02 |
| 8,306,142 B2 * | 11/2012 | Ariyavisitakul | ..... | H04B 7/0617 375/267 |

(Continued)

FOREIGN PATENT DOCUMENTS

| CA | 3122688 A1 * | 6/2020 | ............ H04W 16/18 |
|---|---|---|---|
| JP | 2010193189 A * | 9/2010 | |

(Continued)

OTHER PUBLICATIONS

Takeda et al., "NR Physical Layer Specification in 5G", NTT Docomo Technical Journal, vol. 26, No. 3, Nov. 2018, pp. 47-58 (24 pages including English Translation).

*Primary Examiner* — Berhanu Tadese
(74) *Attorney, Agent, or Firm* — XSENSUS LLP

(57) ABSTRACT

A distributed antenna system and aggregation station of the present disclosure may prevent or reduce radio wave interference when there is a positional relationship in which a plurality of base stations and a plurality of user terminals are arranged on a straight line. The distributed antenna system receives, from each of the base stations, communication path information with each of accommodated user terminals, for each user terminal; and calculates, in a case where it is determined that the plurality of the respective base stations and the plurality of user terminals are arranged on the straight line, transmission weights of respective transmission beams transmitted by the plurality of the respective base stations to the plurality of respective user terminals based on the communication path information for each user terminal received by the receiver. The base stations transmit the respective transmission beams based the respective transmission weights calculated.

6 Claims, 5 Drawing Sheets

(56) References Cited

U.S. PATENT DOCUMENTS

| | | | | |
|---|---|---|---|---|
| 9,300,383 | B2 * | 3/2016 | Kim | H04B 7/0617 |
| 9,788,335 | B2 * | 10/2017 | Miyata | H04B 7/0697 |
| 10,154,496 | B2 * | 12/2018 | Stirling-Gallacher | H04L 5/005 |
| 10,681,564 | B2 * | 6/2020 | Tang | H04L 5/0053 |
| 10,998,942 | B2 * | 5/2021 | Kim | H04B 7/0417 |
| 11,277,244 | B2 * | 3/2022 | Gao | H04L 5/0048 |
| 11,464,017 | B1 * | 10/2022 | Chopra | H04W 72/51 |
| 12,010,521 | B2 * | 6/2024 | Shibata | H04W 92/22 |
| 2013/0343303 | A1 * | 12/2013 | Kim | H04B 7/0639 370/329 |
| 2014/0133481 | A1 * | 5/2014 | Wang | G06F 3/04817 370/352 |
| 2018/0132217 | A1 * | 5/2018 | Stirling-Gallacher | H04L 5/0053 |
| 2019/0093019 | A1 * | 3/2019 | Levine | C10G 25/12 |
| 2019/0124520 | A1 * | 4/2019 | Tang | H04L 5/0058 |
| 2022/0110001 | A1 * | 4/2022 | Ginis | H04W 24/02 |
| 2022/0312404 | A1 * | 9/2022 | Chopra | H04W 72/044 |
| 2023/0308144 | A1 * | 9/2023 | Uchida | G01S 5/0284 |
| 2024/0063850 | A1 * | 2/2024 | Fukuzono | H04B 7/024 |
| 2024/0072847 | A1 * | 2/2024 | Fukuzono | H04B 7/022 |
| 2024/0283517 | A1 * | 8/2024 | Wai | H04B 7/0695 |

FOREIGN PATENT DOCUMENTS

| | | | | |
|---|---|---|---|---|
| JP | 2012222455 | A | * | 11/2012 |
| JP | 2016111637 | A | * | 6/2016 |
| JP | 2016115956 | A | * | 6/2016 |
| JP | 2017069817 | A | * | 4/2017 |
| JP | 2017069818 | A | * | 4/2017 |
| JP | 2019110403 | A | * | 7/2019 |
| JP | 2019110404 | A | * | 7/2019 |
| JP | 2020017815 | A | * | 1/2020 | H04B 7/026 |
| JP | 2020031306 | A | * | 2/2020 | H04B 7/024 |
| JP | 2020174325 | A | * | 10/2020 | H04W 16/04 |
| TW | 201705793 | A | * | 2/2017 | H04J 14/0246 |
| WO | WO-2016208614 | A1 | * | 12/2016 | H04J 14/0246 |
| WO | WO-2018052016 | A1 | * | 3/2018 | G06F 21/602 |
| WO | WO-2020095718 | A1 | * | 5/2020 | H04B 7/155 |
| WO | WO-2020095719 | A1 | * | 5/2020 | H04B 7/15507 |
| WO | WO-2020123208 | A1 | * | 6/2020 | H04W 16/18 |
| WO | WO-2020209094 | A1 | * | 10/2020 | H04W 16/04 |
| WO | WO-2021124442 | A1 | * | 6/2021 | H04B 7/024 |
| WO | WO-2022044309 | A1 | * | 3/2022 | |
| WO | WO-2022044328 | A1 | * | 3/2022 | G01S 5/0284 |
| WO | WO-2022149244 | A1 | * | 7/2022 | H04B 7/022 |
| WO | WO-2022149245 | A1 | * | 7/2022 | H04B 7/022 |
| WO | WO-2022153484 | A1 | * | 7/2022 | H04B 7/022 |
| WO | WO-2022172413 | A1 | * | 8/2022 | |
| WO | WO-2023286187 | A1 | * | 1/2023 | H04B 7/022 |
| WO | WO-2023058089 | A1 | * | 4/2023 | |
| WO | WO-2023148874 | A1 | * | 8/2023 | |
| WO | WO-2023148880 | A1 | * | 8/2023 | |
| WO | WO-2023162177 | A1 | * | 8/2023 | |
| WO | WO-2023162184 | A1 | * | 8/2023 | |
| WO | WO-2023199476 | A1 | * | 10/2023 | |
| WO | WO-2023199484 | A1 | * | 10/2023 | |
| WO | WO-2024023923 | A1 | * | 2/2024 | |
| WO | WO-2024034042 | A1 | * | 2/2024 | |
| WO | WO-2024154327 | A1 | * | 7/2024 | |

* cited by examiner

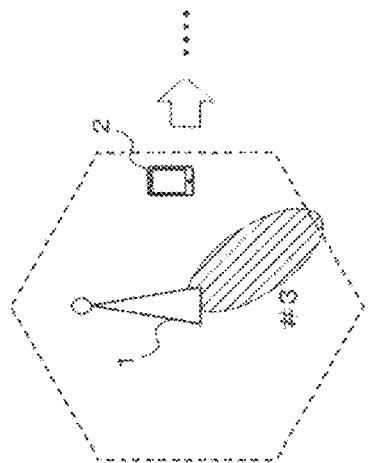
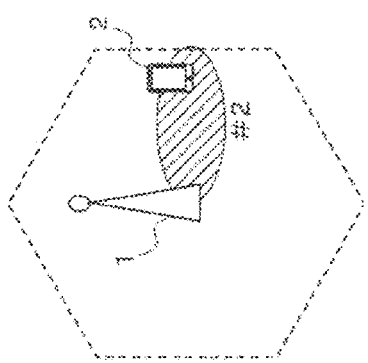
Fig. 4A
Fig. 4B

DISTRIBUTED ANTENNA SYSTEM, WIRELESS COMMUNICATION METHOD, AND CENTRALIZED STATION

CROSS-REFERENCE TO RELATED APPLICATION

The present application is based on PCT filing PCT/JP2021/000384, filed Jan. 7, 2021, the entire contents of which are incorporated herein by reference.

TECHNICAL FIELD

The present invention relates to a distributed antenna system, a wireless communication method, and an aggregation station.

BACKGROUND ART

In a wireless communication system such as a fifth generation mobile communication system (5G), massive multiple input multiple output (MIMO) using a multi-element antenna, non-orthogonal multiple access (NOMA), and the like are known as techniques for improving frequency utilization efficiency.

For example, in an environment (high-density environment) in which 5G base stations are densely arranged, each base station performs beam search as initial access of New Radio (NR). At this time, each base station sequentially transmits a synchronization signal block (Synchronization Signals (SS)/Physical Broadcast CHannel (PBCH) block) by an analog beam having directivity in each surrounding direction, adopts a beam in a direction in which received power is the highest, and starts data communication (for example, see Non Patent Literature 1).

In addition, a distributed antenna system (DAS) is known as a system that enables more efficient MIMO transmission.

CITATION LIST

Non Patent Literature

Non Patent Literature 1: Kazuki Takeda and five others, "NR Physical Layer Specification in 5G", NTT DOCOMO Technical Journal, Vol. 26 No. 3 (November 2018), p. 47-58

SUMMARY OF INVENTION

Technical Problem

However, in a case where each base station densely arranged similarly performs beam search and determines a beam to be adopted, for example, in a case where there is a positional relationship in which a plurality of base stations and a plurality of user terminals (UEs) are arranged on a straight line, there has been a problem that mutual radio wave interference is caused.

The present invention has been made in view of the above-described problem, and an object thereof is to provide a distributed antenna system, a wireless communication method, and an aggregation station capable of preventing radio wave interference even in a case where there is a positional relationship in which a plurality of base stations and a plurality of user terminals are arranged on a straight line.

Solution to Problem

A distributed antenna system according to an aspect of the present invention is a distributed antenna system including: a plurality of base stations that performs MIMO transmission to user terminals at an identical frequency; and an aggregation station that aggregates pieces of information used by the respective base stations, in which the aggregation station includes: a reception unit that receives, from each of the base stations, communication path information with each of accommodated user terminals, for each user terminal; a determination unit that determines whether or not a plurality of the base stations and a plurality of user terminals are arranged on a straight line on the basis of the communication path information for each user terminal received by the reception unit; a calculation unit that calculates transmission weights of respective transmission beams transmitted by the plurality of the respective base stations such that the transmission beams transmitted by the plurality of the respective base stations arranged on the straight line to the plurality of respective user terminals are shifted by a half wavelength or more for the respective user terminals, on the basis of the communication path information for each user terminal received by the reception unit, in a case where the determination unit determines that the plurality of the base stations and the plurality of user terminals are arranged on the straight line; and a control unit that performs control such that the base stations transmit the respective transmission beams, on the basis of the respective transmission weights calculated by the calculation unit.

In addition, a wireless communication method according to an aspect of the present invention is a wireless communication method performed by a plurality of base stations that performs MIMO transmission to user terminals at an identical frequency and an aggregation station that aggregates pieces of information used by the respective base stations, the wireless communication method including: a reception step of receiving, from each of the base stations, communication path information with each of accommodated user terminals, for each user terminal, by the aggregation station; a determination step of determining whether or not a plurality of the base stations and a plurality of user terminals are arranged on a straight line on the basis of the communication path information for each user terminal received; a calculation step of calculating transmission weights of respective transmission beams transmitted by the plurality of the respective base stations such that the transmission beams transmitted by the plurality of the respective base stations arranged on the straight line to the plurality of respective user terminals are shifted by a half wavelength or more for the respective user terminals, on the basis of the communication path information for each user terminal received, in a case where it is determined that the plurality of the base stations and the plurality of user terminals are arranged on the straight line; and a control step of performing control such that the base stations transmit the respective transmission beams, on the basis of the respective transmission weights calculated.

In addition, an aggregation station according to an aspect of the present invention is an aggregation station that aggregates pieces of information used by a plurality of respective base stations that performs MIMO transmission to user terminals at an identical frequency, the aggregation station including: a reception unit that receives, from each of the base stations, communication path information with each of accommodated user terminals, for each user terminal; a determination unit that determines whether or not a plurality of the base stations and a plurality of user terminals are arranged on a straight line on the basis of the communication path information for each user terminal received by the reception unit; a calculation unit that calculates transmission weights of respective transmission beams transmitted by the plurality of the respective base stations such that the transmission beams transmitted by the plurality of the respective base stations arranged on the straight line to the plurality of respective user terminals are shifted by a half wavelength or more for the respective user terminals, on the basis of the communication path information for each user terminal received by the reception unit, in a case where the determination unit determines that the plurality of the base stations and the plurality of user terminals are arranged on the straight line; and a control unit that performs control such that the base stations transmit the respective transmission beams, on the basis of the respective transmission weights calculated by the calculation unit.

Advantageous Effects of Invention

According to the present invention, radio wave interference can be prevented even in a case where there is a positional relationship in which a plurality of base stations and a plurality of user terminals are arranged on a straight line.

BRIEF DESCRIPTION OF DRAWINGS

FIG. 4A is a diagram schematically illustrating an operation example in a case where a base station performs beam search. In FIG. 4B a diagram schematically illustrates a state in which a beam to be adopted by the base station is determined.

DESCRIPTION OF EMBODIMENTS

First, background of the present invention will be described. FIGS. 4A and 4B schematically illustrate an operation example in a case where a base station of 5G performs beam search as an initial access of NR and determines a beam to be adopted. FIG. 4A is a diagram schematically illustrating an operation example in a case where the base station performs beam search. FIG. 4B is a diagram schematically illustrating a state in which a beam to be adopted by the base station is determined.

As illustrated in FIG. 4A, a base station 1 applies, for example, a plurality of synchronization signal blocks (SS/PBCH blocks) to a plurality of beams having directivity in different directions, transmits the beams sequentially (in the order of a beam #1, a beam #2, a beam #3, ***) in respective surrounding directions, and searches for a position of a user terminal 2.

Then, as illustrated in FIG. 4B, the base station 1 adopts the beam #2 in a direction in which received power from the user terminal 2 is the highest, and starts data communication.

Figure 5A:
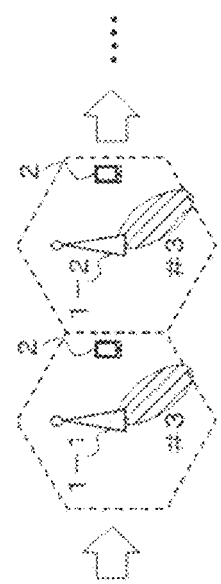
FIG. 5A is a diagram schematically illustrating an operation example in a case where a plurality of base stations in a high-density environment performs beam search as initial access of NR.
Figure 5B:
In FIG. 5B, a diagram schematically illustrates a state in which the plurality of base stations has determined beams to be adopted without causing radio wave interference.
Figure 5C:
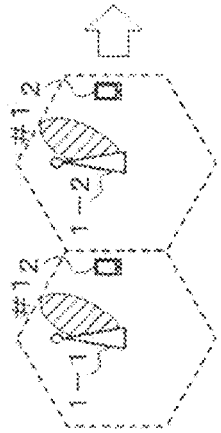
In FIG. 5C a diagram schematically illustrates a state in which beams adopted by the plurality of base stations cause radio wave interference.

FIGS. 5A-5C schematically illustrate an operation example in a case where a plurality of base stations in a high-density environment performs beam search as initial access of NR and determine a beam to be adopted. FIG. 5A is a diagram schematically illustrating an operation example in a case where the plurality of base stations in the high-density environment performs beam search as initial access of NR. FIG. 5B is a diagram schematically illustrating a state in which the plurality of base stations has determined beams to be adopted without causing radio wave interference. FIG. 5C is a diagram schematically illustrating a state in which beams adopted by the plurality of base stations cause radio wave interference.

As illustrated in FIG. 5A, a base station 1-1 and a base station 1-2 transmit, for example, beams of the same frequency sequentially (in the order of the beam #1, the beam #2, the beam #3, ***) in respective surrounding directions, and search for user terminals 2 in respective cells.

As illustrated in FIG. 5B, in a case where the base station 1-1 adopts the beam #3 and the base station 1-2 adopts the beam #4, a direction of the beam #3 emitted by the base station 1-1 is different from a direction of the beam #4 emitted by the base station 1-2, and radio wave interference is not caused.

On the other hand, as illustrated in FIG. 5C, in a case where the base station 1-1 adopts the beam #2 and the base station 1-2 adopts the beam #5, there is a positional relationship in which the base station 1-1, the user terminal 2 accommodated in the base station 1-1, the user terminal 2 accommodated in the base station 1-2, and the base station 1-2 are arranged on a straight line. In this case, the base station 1-1, the user terminal 2 accommodated in the base station 1-1, the user terminal 2 accommodated in the base station 1-2, and the base station 1-2 may cause mutual radio wave interference.

Thus, a distributed antenna system according to an embodiment to be described next is configured to have the following functions to be able to prevent radio wave interference even in a case where there is a positional relationship in which a plurality of base stations and a plurality of user terminals are arranged on a straight line.

Figure 1:
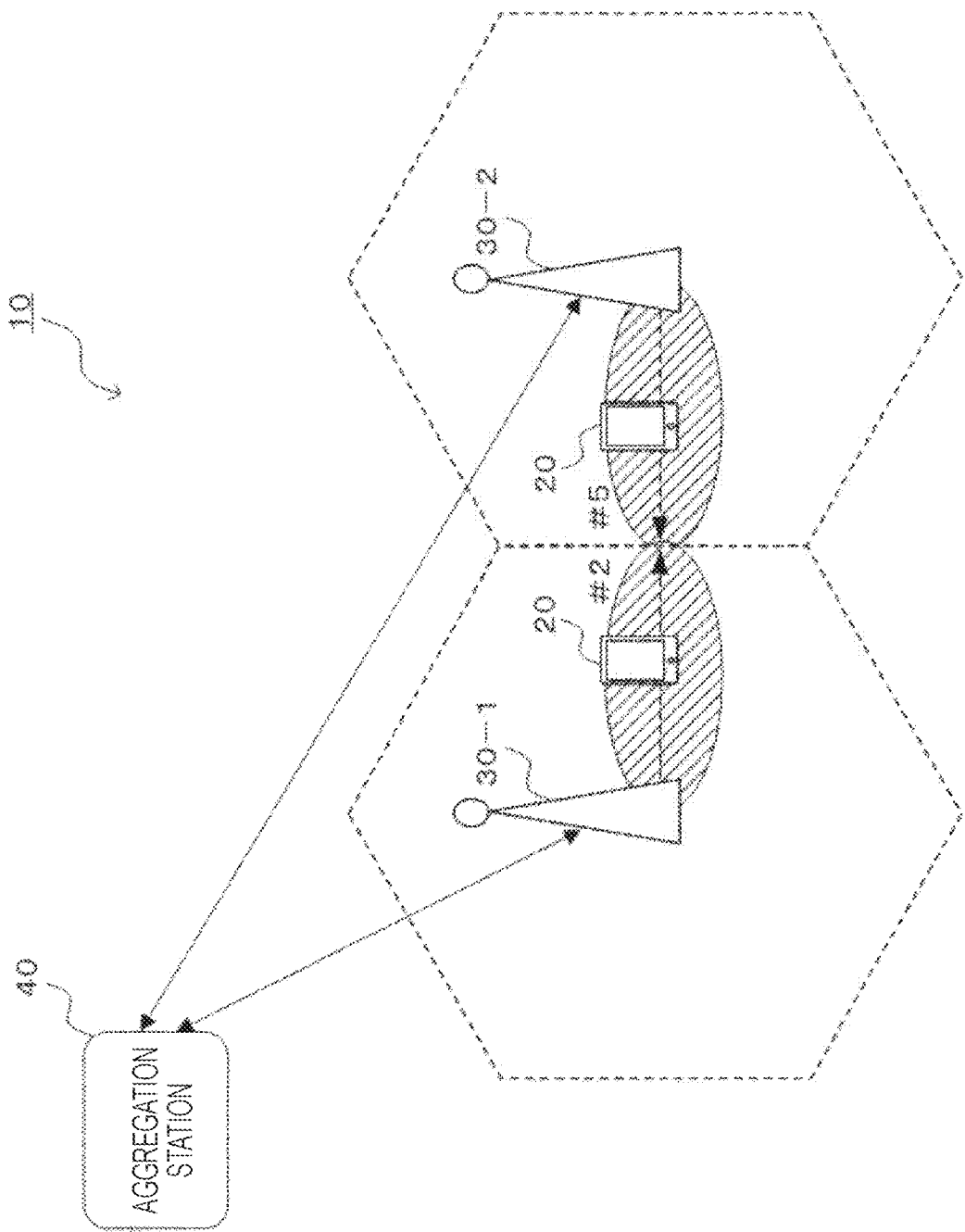
FIG. 1 is a diagram illustrating a configuration example of a distributed antenna system according to an embodiment.

FIG. 1 is a diagram illustrating a configuration example of a distributed antenna system 10 according to an embodiment. As illustrated in FIG. 1, the distributed antenna system 10 includes, for example, a base station 30-1 that accommodates a user terminal 20 in a cell, a base station 30-2 that accommodates a user terminal 20 in a cell, and an aggregation station 40.

The base station 30-1 and the base station 30-2 transmit, for example, beams of the same frequency sequentially in respective surrounding directions, and search for the user terminals 20 in respective cells.

For example, the base station 30-1 adopts the beam #2, and the base station 30-2 adopts the beam #5. Then, the base station 30-1 and the base station 30-2 perform MIMO transmission at the same frequency to the user terminals 20 in their own cells. At this time, there is a positional relationship in which the base station 30-1, the user terminal 20 accommodated in the base station 30-1, the user terminal 20 accommodated in the base station 30-2, and the base station 30-2 are arranged on a straight line.

The aggregation station 40 aggregates pieces of information respectively used by the base station 30-1 and the base station 30-2, and controls each of the base station 30-1 and the base station 30-2.

Note that, in the distributed antenna system 10, for example, the aggregation station 40 performs distributed digital MIMO signal processing. At this time, the aggregation station 40 acquires communication path information (channel state information (CSI)) between each of the base station 30-1 and the base station 30-2 and the user terminal 20, and calculates a transmission weight for each of the base station 30-1 and the base station 30-2 to perform beam forming (see, for example, Non Patent Literature 2 below).

Non Patent Literature 2: Hayato Fukuzono and four others, "Experimental Study on Simultaneous Transmission of Multiple Access Points Using Implicit Feedback", The transactions of the Institute of Electronics, Information and Communication Engineers. B, Vol. J99-B No. 9 (September 2016), p. 705-723

Hereinafter, in a case where any of a plurality of components such as the base station 30-1 and the base station 30-2 is not specified, it is simply abbreviated as the base station 30 or the like.

Figure 2:
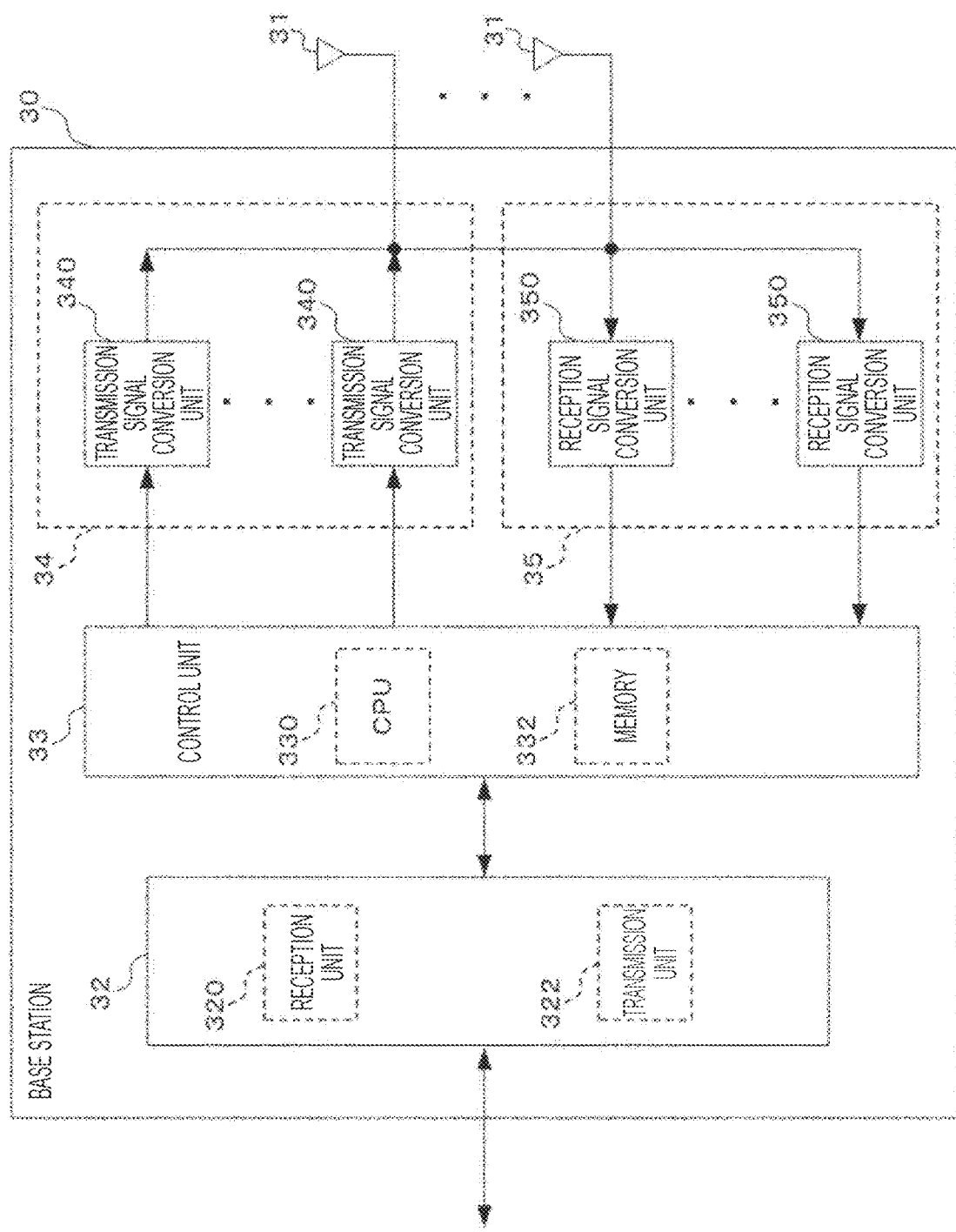
FIG. 2 is a functional block diagram illustrating functions of a base station.

Next, a specific configuration example of the base station 30 will be described. FIG. 2 is a functional block diagram illustrating functions of the base station 30. As illustrated in FIG. 2, the base station 30 includes a plurality of antennas 31, a communication unit 32, a control unit 33, a transmission unit 34, and a reception unit 35.

Each of the plurality of antennas 31 is connected to the transmission unit 34 and the reception unit 35, and enables MIMO transmission between the base station 30 and the user terminal 20.

The communication unit 32 includes a reception unit 320 and a transmission unit 322, and performs bidirectional communication with the aggregation station 40 via, for example, an optical fiber (not illustrated). The reception unit 320 receives information transmitted by the aggregation station 40 and outputs the received information to the control unit 33. The transmission unit 322 transmits information input from the control unit 33 to the aggregation station 40.

The control unit 33 includes, for example, a CPU 330 and a memory 332, and controls each unit constituting the base station 30. For example, the control unit 33 performs predetermined processing on the information input from the communication unit 32 and outputs the processed information to the transmission unit 34. In addition, the control unit 33 performs predetermined processing on information input from the reception unit 35, and outputs the processed information to the communication unit 32.

The transmission unit 34 includes a plurality of transmission signal conversion units 340. The transmission signal conversion unit 340 includes a pulse shaping (performing necessary band limitation by a roll off filter or the like) unit, a digital to analog conversion (DAC) unit, a radio frequency (RF) unit, and the like (not illustrated). Then, the transmission signal conversion unit 340 performs processing for converting a signal input from the control unit 33 into a high frequency signal and transmitting the high frequency signal from the antenna 31.

Then, the plurality of antennas 31 emits transmission beams in a predetermined direction, whereby the base station 30 transmits a signal to the user terminal 20 located in the predetermined direction. In addition, the base station 30 receives a beam transmitted by the user terminal 20 located in a predetermined direction by the plurality of antennas 31.

The reception unit 35 includes a plurality of reception signal conversion units 350. The reception signal conversion unit 350 includes an RF unit, an analog to digital conversion (ADC) unit, a pulse shaping unit, and the like (not illustrated). Then, the reception signal conversion unit 350 performs frequency conversion of the high frequency reception signal received by each of the plurality of antennas 31 into a low frequency baseband signal, and outputs the low frequency baseband signal to the control unit 33.

Here, the reception unit 35 receives communication path information (CSI) with each of the user terminals 20 accommodated in the base station 30 for each user terminal, and outputs the communication path information to the control unit 33. Note that the base station 30 may be configured such that the reception unit 35 receives a control signal for CSI, and the control unit 33 estimates CSI.

That is, the base station 30 may be configured to perform explicit beam forming, or may be configured to perform implicit beam forming.

Figure 3:
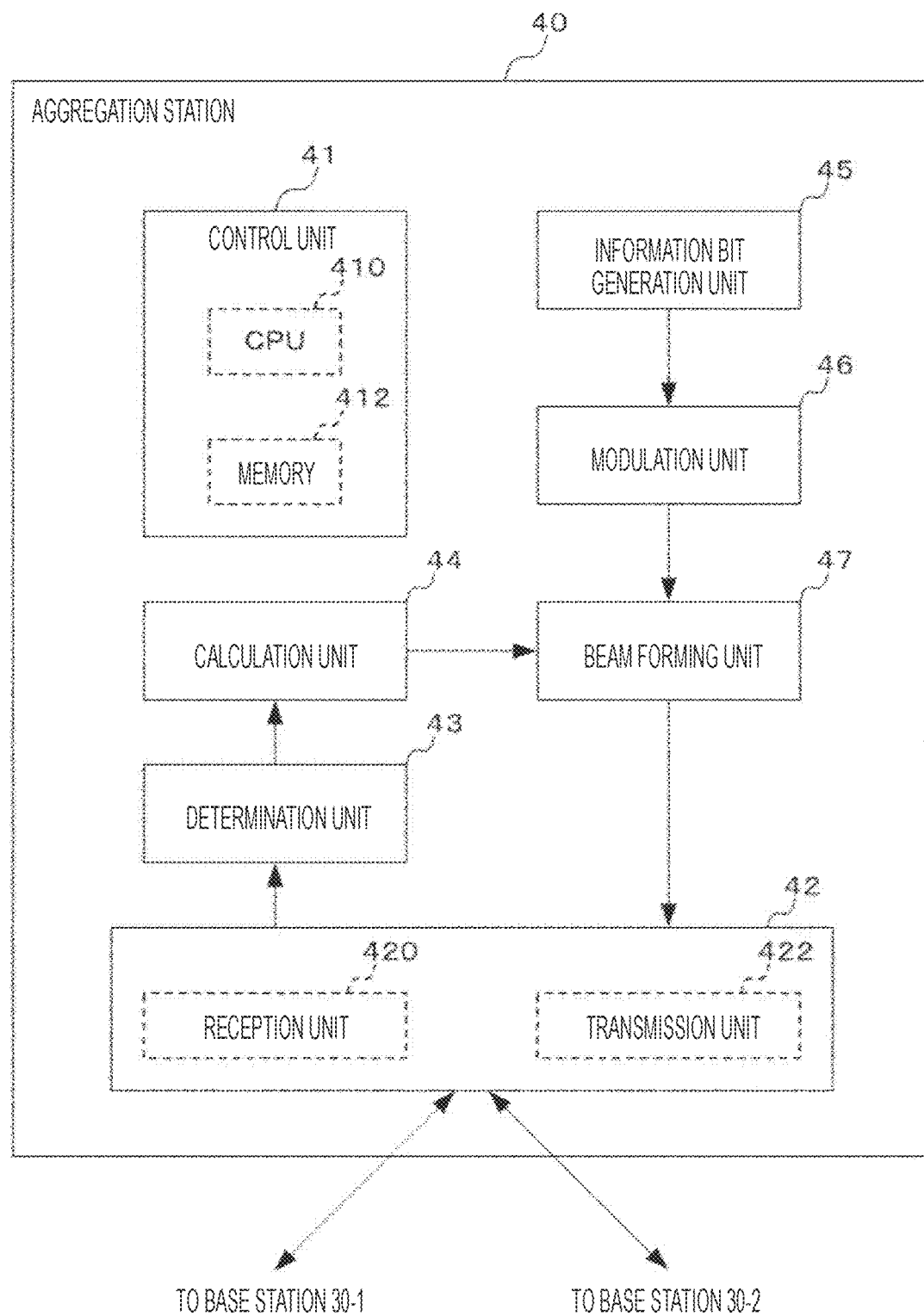
FIG. 3 is a functional block diagram illustrating functions of an aggregation station according to the embodiment.

Next, a specific configuration example of the aggregation station 40 will be described. FIG. 3 is a functional block diagram illustrating functions of the aggregation station 40 according to the embodiment. As illustrated in FIG. 3, the aggregation station 40 includes a control unit 41, a communication unit 42, a determination unit 43, a calculation unit 44, an information bit generation unit 45, a modulation unit 46, and a beam forming unit 47.

The control unit 41 includes, for example, a CPU 410 and a memory 412, and controls each unit constituting the aggregation station 40. Note that a specific example of a function of the control unit 41 will be described later.

The communication unit 42 includes a reception unit 420 and a transmission unit 422, and performs bidirectional communication with each of the base station 30-1 and the base station 30-2 via, for example, an optical fiber (not illustrated). The reception unit 420 receives communication path information with each of the accommodated user terminals 20 from each of the base station 30-1 and the base station 30-2 for each user terminal, and outputs the communication path information to the determination unit 43. The transmission unit 422 transmits a signal output from the beam forming unit 47 to each of the base station 30-1 and the base station 30-2 depending on control of the control unit 41.

The determination unit 43 determines whether or not the plurality of base stations 30 and the plurality of user terminals 20 are arranged on a straight line on the basis of the communication path information for each user terminal 20 received by the reception unit 420, and outputs a determination result to the calculation unit 44.

On the basis of "the fact that the digital beam in MIMO transmission does not depend on the directivity (the characteristics of the MIMO channel become uncorrelated) as long as a distance between transmission stations and a distance between reception stations each are a half wavelength or more: (see, for example, Non Patent Literature 3 below)", the calculation unit 44 calculates a transmission weight of each transmission beam to be transmitted by each base station 30, and outputs a calculation result to the beam forming unit 47.

Non Patent Literature 3: Kazuhiko Fukawa, "Chapter 6 Diversity Technology", The Institute of Electronics, Information and Communication Engineers "Knowledge Base" Group 4 (Mobile/Wireless)-1 (Basics of Wireless Communication) Nov. 9, 2010, p. 1-9

For example, in a case where the determination unit 43 determines that the plurality of base stations 30 and the plurality of user terminals 20 are arranged on the straight line, the calculation unit 44 calculates transmission weights of respective transmission beams transmitted from the plurality of respective base stations 30 on the basis of the communication path information for each user terminal 20 received by the reception unit 420 so that transmission beams transmitted from the plurality of respective base stations 30 arranged on the straight line to the plurality of respective user terminals 20 are shifted by a half wavelength or more for the respective user terminals 20, and outputs the calculation result to the beam forming unit 47.

In addition, the calculation unit 44 may calculate the transmission weights of the respective transmission beams transmitted by the plurality of respective base stations 30 so that the transmission beams transmitted by the plurality of respective base stations 30 arranged on the straight line to the plurality of respective user terminals 20 increase gains for the respective user terminals 20.

That is, the calculation unit 44 may have a function of Coordinated Multi-Point (CoMP) with Joint Transmission (JT) of long term evolution (LTE)-Advanced. At this time, the calculation unit 44 performs calculation for causing the base station 30-1 and the base station 30-2 to perform cooperative operation of simultaneously transmitting phase-aligned signals to perform coherent transmission to the user terminals 20 to intensify the signals at reception points without interference of the signals with each other.

In addition, in a case where the determination unit 43 determines that the plurality of base stations 30 and the plurality of user terminals 20 are not arranged on the straight line, the calculation unit 44 calculates the transmission weights of the respective transmission beams transmitted by the plurality of respective base stations 30 and outputs calculation results to the beam forming unit 47 as in the conventional case.

The information bit generation unit 45 generates data information bits to be transmitted to the base station 30-1 and the base station 30-2, respectively, and outputs the data information bits to the modulation unit 46. The data information bits are, for example, a bit string corresponding to a data signal input from the outside (not illustrated), a data signal generated inside, or the like. Note that the information bit generation unit 45 may have an error correction coding function that generates an error correction code at a predetermined coding rate, an interleaving function, and the like.

The modulation unit 46 modulates the data information bits generated by the information bit generation unit 45 for each of the base station 30-1 and the base station 30-2 by a predetermined modulation scheme (for example, quadrature amplitude modulation (QAM) or the like), and outputs each of modulated data signals to the beam forming unit 47.

On the basis of the transmission weights calculated by the calculation unit 44, the beam forming unit 47 performs processing on each of the data signals modulated by the modulation unit 46 so that each of the base station 30-1 and the base station 30-2 can form a predetermined transmission beam, and outputs a processing result to the transmission unit 422. That is, the beam forming unit 47 performs processing to prevent radio wave interference in the distributed antenna system 10.

Then, as described above, the transmission unit 422 transmits the signal (processing result) output by the beam forming unit 47 to each of the base station 30-1 and the base station 30-2 depending on the control of the control unit 41.

That is, the control unit 41 has a function of performing control to cause the base station 30-1 and the base station 30-2 to transmit the respective transmission beams on the basis of the respective transmission weights calculated by the calculation unit 44.

As described above, in the distributed antenna system 10 according to the embodiment, the aggregation station 40 calculates the transmission weights of the respective transmission beams transmitted by the plurality of respective base stations 30 so that the transmission beams transmitted by the plurality of respective base stations 30 arranged on a straight line to the plurality of respective user terminals 20 are shifted by a half wavelength or more for the respective user terminals 20, on the basis of the communication path information for each user terminal 20, and thus, it is possible to prevent radio wave interference even in a case where there is a positional relationship in which the plurality of base stations 30 and the plurality of user terminals 20 are arranged on the straight line.

In addition, some or all of the functions of each of the base station 30 and the aggregation station 40 may be configured by hardware such as a programmable logic device (PLD) or a field programmable gate array (FPGA) or may be configured as a program executed by a processor such as a CPU.

For example, the base station 30 and the aggregation station 40 can be implemented by using a computer and a program, and the program can be recorded in a storage medium or provided through a network.

REFERENCE SIGNS LIST

10 distributed antenna system
20 user terminal
30-1, 30-2 base station
31 antenna
32 communication unit
33 control unit
34 transmission unit
35 reception unit
40 aggregation station
41 control unit
42 communication unit
43 determination unit
44 calculation unit
45 information bit generation unit
46 modulation unit
47 beam forming unit
320 reception unit
322 transmission unit
330 CPU
332 memory
340 transmission signal conversion unit
350 reception signal conversion unit
410 CPU
412 memory
420 reception unit
422 transmission unit

The invention claimed is:

1. A distributed antenna system, comprising:
a plurality of base stations to perform multiple-input-multiple-output (MIMO) [MIMO] transmission to user terminals at an identical frequency; and
an aggregation station to aggregate pieces of information used by the respective base stations, wherein the aggregation station includes:

a receiver to receive, from each of the base stations, communication path information with each of accommodated user terminals, for each user terminal;

determination circuitry configured to determine, on a basis of the communication path information for each user terminal received by the receiver, whether or not a plurality of the base stations and a plurality of user terminals are arranged on a straight line;

calculation circuitry configured to calculate, in a case where the determination circuitry determines that the plurality of the base stations and the plurality of user terminals are arranged on the straight line, transmission weights of respective transmission beams transmitted by the plurality of the respective base stations to the plurality of respective user terminals on the basis of the communication path information for each user terminal received by the receiver, wherein the transmission beams are shifted by a half wavelength or more for the respective user terminals; and control circuitry configured to control such that the base stations transmit the respective transmission beams, on a basis of the respective transmission weights calculated by the calculation circuitry.

2. The distributed antenna system according to claim 1, wherein:

the calculation circuitry is further configured to calculate the transmission weights of the respective transmission beams transmitted by the plurality of the respective base stations such that the transmission beams transmitted by the plurality of the respective base stations arranged on the straight line to the plurality of respective user terminals increase gains for the respective user terminals.

3. A wireless communication method, comprising:

receiving, from each of a plurality of base stations that performs multiple-input-multiple-output (MIMO) transmission to user terminals at an identical frequency, communication path information with each of accommodated user terminals, for each user terminal, by an aggregation station to aggregate pieces of information used by the respective base stations;

determining, on a basis of the communication path information for each user terminal received by the receiver, whether or not a plurality of the base stations and a plurality of user terminals are arranged on a straight line;

calculating, in a case where the determining indicates that the plurality of the base stations and the plurality of user terminals are arranged on the straight line, transmission weights of respective transmission beams transmitted by the plurality of the respective base stations to the plurality of respective user terminals on the basis of the communication path information for each user terminal received, wherein the transmission beams are shifted by a half wavelength or more for the respective user terminals; and controlling the base stations to transmit the respective transmission beams on a basis of the respective transmission weights which have been calculated.

4. The wireless communication method according to claim 3, wherein;

in the calculating, the transmission weights of the respective transmission beams transmitted by the plurality of the respective base stations are calculated such that the transmission beams transmitted by the plurality of the respective base stations arranged on the straight line to the plurality of respective user terminals increase gains for the respective user terminals.

5. An aggregation station, comprising:

a receiver to receive, from each of a plurality of base stations that performs multiple-input-multiple-output (MIMO) transmission to user terminals at an identical frequency, communication path information with each of accommodated user terminals, for each user terminal;

determination circuitry configured to determine, on a basis of the communication path information for each user terminal received by the receiver, whether or not a plurality of the base stations and a plurality of user terminals are arranged on a straight line;

calculation circuitry configured to calculate, in a case where the determination circuitry determines that the plurality of the base stations and the plurality of user terminals are arranged on the straight line, transmission weights of respective transmission beams transmitted by the plurality of the respective base stations to the plurality of respective user terminals on the basis of the communication path information for each user terminal received by the receiver, wherein the transmission beams are shifted by a half wavelength or more for the respective user terminals; and control circuitry configured to perform control such that the base stations transmit the respective transmission beams, on a basis of the respective transmission weights calculated by the calculation circuitry.

6. The aggregation station according to claim 5, wherein the calculation circuitry is further configured to:

calculate the transmission weights of the respective transmission beams transmitted by the plurality of the respective base stations such that the transmission beams transmitted by the plurality of the respective base stations arranged on the straight line to the plurality of respective user terminals increase gains for the respective user terminals.

* * * * *